WINFIELD DENTON, OF IOWA CITY, IOWA.

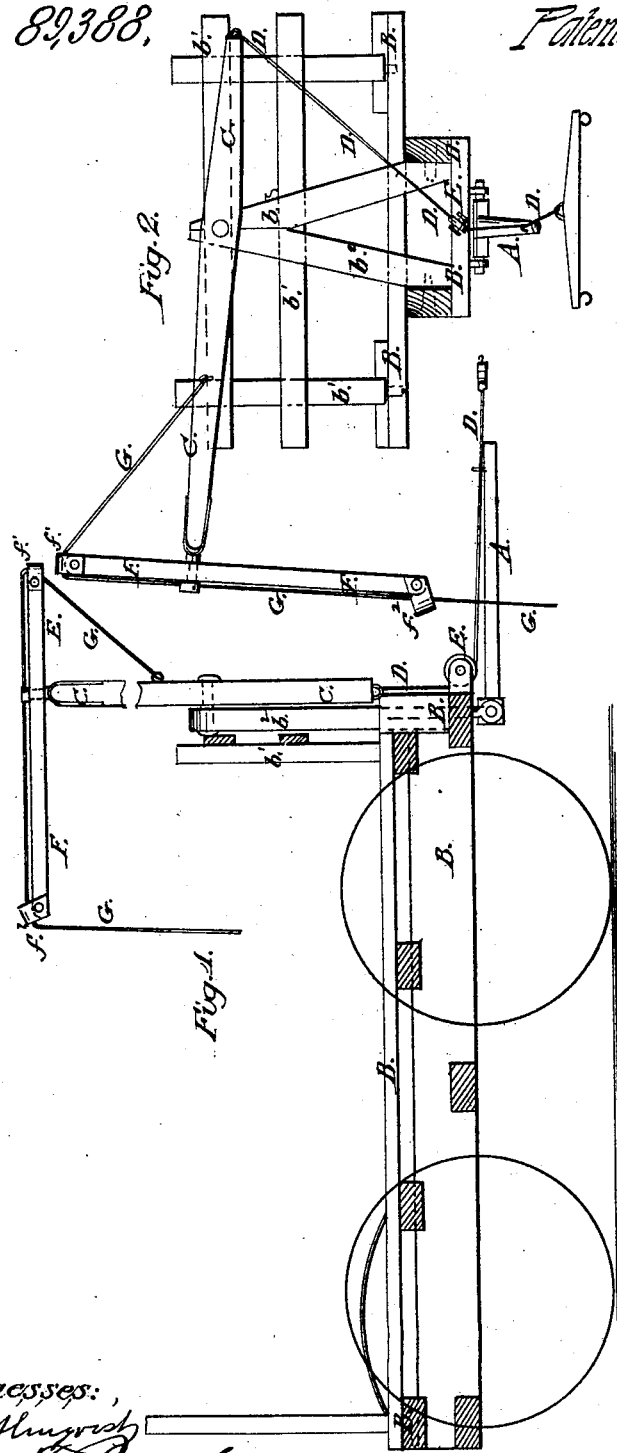

Letters Patent No. 89,388, dated April 27, 1869.

IMPROVEMENT IN HAY-LOADERS.

The Schedule referred to in these Letters Patent and making part of the same.

*To all whom it may concern:*

Be it known that I, WINFIELD DENTON, of Iowa City, in the county of Johnson, and State of Iowa, have invented a new and improved Hay-Loader; and I do hereby declare that the following is a full, clear, and exact description thereof, which will enable others skilled in the art to make and use the same, reference being had to the accompanying drawing, forming part of this specification, in which—

Figure 1 is a side view of a hay-rack to which my improvement has been attached.

Figure 2 is a front-end view of the same.

Similar letters of reference indicate corresponding parts.

My invention has for its object to furnish an improved device by means of which the hay may be easily and conveniently loaded upon a wagon or cart, without the necessity of hand-pitching; and It consists in the construction and combination of the various parts of the loader, as hereinafter more fully described.

A represents the tongue, and B, the rack of an ordinary hay-wagon, about the construction of which there is nothing new, except that the rack B may be provided with a frame or guard, $b^1$, at its forward end, to prevent the hay from projecting, and thus interfering with the operation of the loader.

C is a bar, which is pivoted eccentrically to the front post or standard $b^2$, of the rack B.

To the end of the shaft-arm of the bar C is attached one end of the rope D, which passes around a guide-pulley, E, attached to the bed-frame of the rack B.

The rope D passes along the tongue A, and to its end is attached the horse, by which the loader is operated.

To the end of the long arm of the bar C, and at right angles to said bar, is eccentrically swivelled another bar, F.

G is a rope, one end of which is attached to the long arm of the bar C, about half way between the end and pivoting-point of said bar.

The rope G passes through a keeper, $f^1$, attached to the end of the short arm of the bar F, passes along the upper side of said bar F, and through a keeper, $f^2$, attached to the end of the long arm of said bar, and to its other end is attached a harpoon hay-fork.

In loading hay, the horse is backed up, bringing the loader into the position shown in fig. 2. The fork is then thrust into the hay, and the horse is started up, which brings the loader into the position shown in fig. 1, the weight of the loaded fork causing the long arm of the bar F to swing inward, over the rack B, into the position shown in fig. 1. The fork is then tripped, to discharge the hay, and the horse again backed up, to raise another forkful.

Having thus described my invention,

What I claim as new, and desire to secure by Letters Patent, is—

An improved loader, formed by the combination of the rope D, pivoted bar C, pivoted bar F, and rope G, with each other and with an ordinary hay-rack, substantially as herein shown and described, and for the purpose set forth.

WINFIELD DENTON.

Witnesses:
N. F. HARRINGTON,
E. G. FRACKER.